Oct. 23, 1951      H. L. VINING      2,572,786

PRESSURE REGULATOR FOR FUEL LINES

Filed Aug. 26, 1949

INVENTOR.
HENRY L. VINING
BY
ATTORNEYS

Patented Oct. 23, 1951

2,572,786

UNITED STATES PATENT OFFICE 2,572,786

PRESSURE REGULATOR FOR FUEL LINES

Henry L. Vining, Dallas, Tex.

Application August 26, 1949, Serial No. 112,529

9 Claims. (Cl. 50—23)

This invention relates to new and useful improvements in pressure regulator for fuel lines.

One object of the invention is to provide an improved pressure regulator adapted to be connected in the fuel line of an internal combustion engine or a burner or the like, for controlling the pressure and supply of liquid fuel to the motor carburetor or burner.

Another object of the invention is to provide improved means for automatically and positively controlling the rate of flow of the liquid from an area in which both the pressure and rate of supply vary to an area in which the rate of withdrawal is variable, but wherein the pressure is maintained constant.

Still another object of the invention is to provide an improved pressure regulator of small construction and light in weight, whereby it may be connected in the liquid fuel line between the fuel pump and the carburetor of an internal combustion motor for the purpose of maintaining a constant low pressure of fuel being supplied to said carburetor, regardless of the rate of supply and the pressure of the fuel being discharged by the pump and of the rate at which said fuel is being used in said carburetor.

Still another object of the invention is to provide an improved pressure regulator having a bowl and a bonnet above the bowl open to atmospheric pressure with a diaphragm disposed therebetween and a conduit discharging liquid into the bowl, together with a valve ball for controlling the supply of liquid to the bowl, in combination with a conduit co-acting with the ball and normally supporting the diaphragm which is urged downwardly by a coil spring confined in said bonnet.

A construction designed to carry out the invention will be hereinafter described together with other features of the invention.

Figure 1:
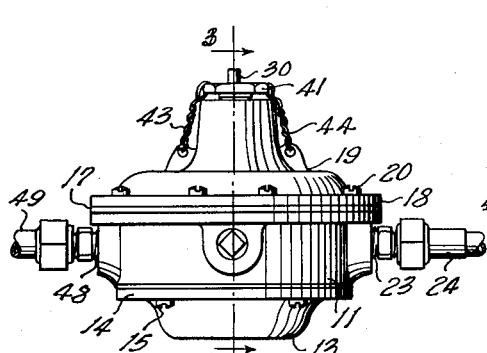
Figure 2:
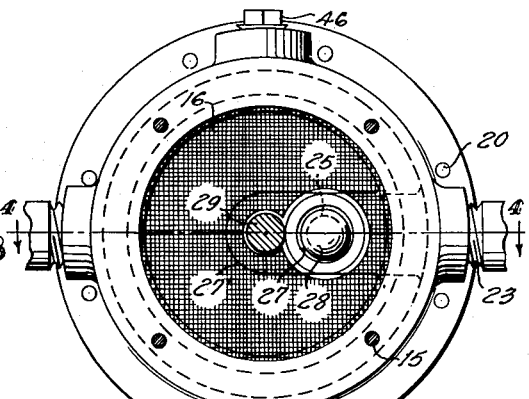
Figure 4:
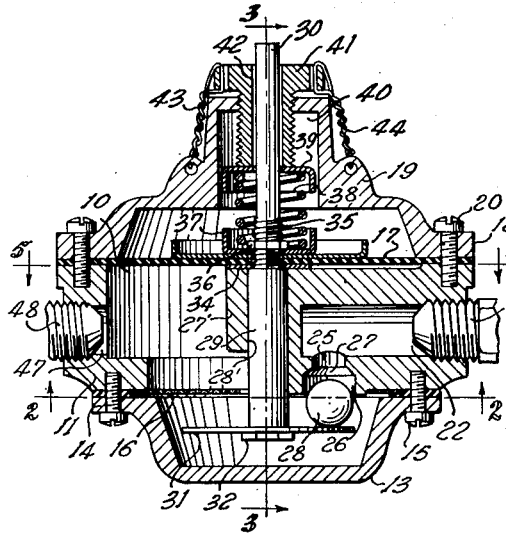
Figure 3:
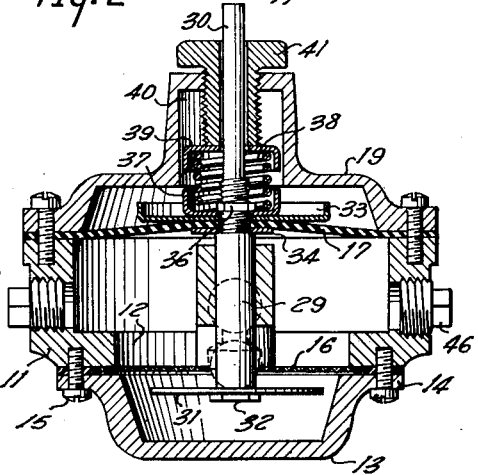
Figure 5:
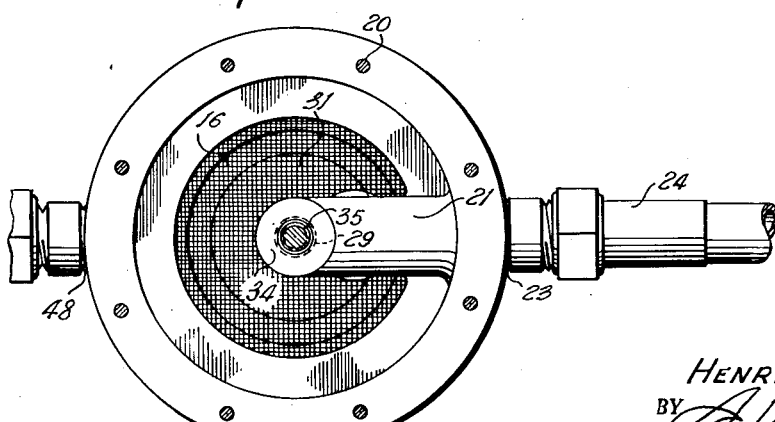

The invention will be more readily understood from a reading of the following specification and by reference to the accompanying drawing, wherein an example of the invention is shown, and wherein:

Fig. 1 is a side elevation of a pressure regulator constructed in accordance with the invention, Fig. 2 is an enlarged, horizontal, cross-sectional view taken on the line 2—2 of Fig. 1, Fig. 3 is an enlarged, vertical, sectional view taken on the line 3—3 of Fig. 1, Fig. 4 is a transverse, sectional view at right angles to Fig. 3, and Fig. 5 is an enlarged, horizontal, cross-sectional view taken on the line 5—5 of Fig. 1.

In the drawing, the numeral 10 designates a cylindrical bowl having a flat bottom 11 which surrounds a reduced opening 12. A cup 13 provided at its top with an annular outwardly-directed flange 14, having a flat upper surface, is attached to the bottom 11 by machine screws 15. A fine mesh screen 16 is confined between the flat surfaces of the bottom 11 and the flange 14. The bowl has a flat annular top supporting the annular margin of a diaphragm 17. The diaphragm is held on the bowl by the annular flange 18 of a bonnet 19, secured in place by machine screws 20.

The bowl is formed with a radial conduit 21 formed integral therewith and provided with a duct 22 closed at its inner end and screw-threaded at its outer end to receive a nipple 23, whereby fuel may be supplied by a fuel line 24 connected to said nipple. A port 25 connects the bottom of the cup near the inner end of the latter with a bore 26 through a valve seat 27. The valve seat is adapted to receive an upwardly movable valve ball 28 housed in the bore 26, whereby the flow of fuel from the duct 22 to the cup 13 is metered.

The liquid fuel which is discharged from the bore 26 flows into the cup 13 and upwardly through the screen 16, whereby most of the sediment is restrained. The liquid fuel fills the cup and the bowl and acts against the underside of the diaphragm 17. The fuel being under some pressure will lift the diaphragm when a predetermined pressure is reached. A collar 27' is formed integral with the inner end of the conduit 21 and has a bore 28' disposed co-axially of the bowl, cup and bonnet. A plunger 29 has a sliding fit in the bore 28' and is made integral with the lower end of a stem 30. A horizontal disk 31 is secured to the lower end of the plunger by a nut 32 and is disposed in the cup 13 so as to support the ball 28. A flanged washer 33 engages the upper side of the diaphragm, the central portion of which is supported on a washer 34 resting on top of the collar. The stem has a screw-threaded portion 35 at its lower end adapted to receive a nut 36 which is screwed down into the bottom of a spring cup 37 whereby the diaphragm is fastened on the upper end of the plunger 29. A coil spring surrounding the stem has its bottom supported in the lower cup 37 and its upper end confined in an inverted cup or cap 39 which is disposed in a dome 40 forming the upper part of the bonnet. A plug 41 screwed into the top of the dome has an axial bore 42 in which the stem is loosely disposed so that the interior of the dome is at all times open to the atmosphere. By adjusting the plug 41, the compression of the spring 38 may be controlled. After the compression of the spring is adjusted, the plug is held in place by wire seals 43 secured to the top of the plug and the bonnet 19.

It is obvious that the spring 38 is set to resist upward movement of the diaphragm 17 until a predetermined liquid pressure has been built up below said diaphragm. As the spring moves upwardly, its compression is increased and consequently the up and down movement of the disk 31 is controlled. The ball 28 being confined in the bore 26 and movable towards its seat 27, will meter the flow through the port 25. Screw-threaded openings 45 are provided in the bowl and closed by plugs 46. These plugs may be removed and attachments made to the openings for testing the meter. Diametrically opposite the conduit 21 the bowl has an outlet opening 47 for receiving a nipple 48 attached to the discharge line 49.

The pressure regulator has many advantages. It is installed in the fuel line to the carburetor of an internal combustion engine and being in advance of said carburetor meters the supply of liquid fuel thereto. Since the common practice of motor manufacturers is to set fuel pumps at the lowest effective pressure, conditions arise where the fuel is delivered to the carburetor at too high a pressure. The fuel at pump pressure is delivered to the bowl 10 and acts against the diaphragm 17. By setting the spring 38 under a predetermined compression, it is obvious that as the pressure increases or decreases, the diaphragm 17 will be raised or lowered and the valve ball 28 moved toward and away from its seat 27, thus metering the flow of fuel into the bowl and supplied to the carburetor. By this means, fuel is fed to the carburetor steadily and under constant pressure in accordance with the load under which the carburetor is working. Flooding of the carburetor and stalling of the motor at low speeds which is generally caused by unequal supply of fuel to the carburetor, is eliminated by this device which holds the pressure down to the desired minimum and maintains a proper supply of fuel regardless of engine speed and operation of the fuel pump. The device prevents raw gasoline from being taken into the cylinders of the motor and diluting the lubricant.

The device may be used in various manners. If it is desired to use the regulator to feed a liquid from an overhead tank to a carburetor that is located at some lower level, and the conditions are such that a constant low pressure must be maintained in the bowl at all times regardless of the rate at which the liquid therein is being used, the device may be effectively used. Under these circumstances, the hydraulic head of liquid in the overhead tank is continually decreasing as liquid is drawn therefrom, and hence the total pressure on the liquid flowing therefrom is constantly decreasing. The rate of flow of liquid from said overhead tank is variable, due to the fact that the rate at which liquid in said lower container is being used is not constant. However, it is required that the pressure on the liquid in said lower container must remain constant. By placing the device in the discharge line from the overhead tank and connecting the duct 22 thereto, the liquid will flow to the bowl and be successfully metered. Another instance is supplying liquid fuel to a gravity-type burner from an overhead tank. In order to maintain the burner at its maximum efficiency, the pressure on the fuel within the burner should be maintained constant regardless of the rate at which said burner uses fuel. Further, as the fuel is withdrawn from said overhead tank, the total pressure available gradually, but not constantly, decreases. The regulator herein set forth will automatically control the rate of flow of fuel to the burner and yet maintain a constant pressure within said burner.

Motor vehicles now in common use are equipped with fuel pumps which withdraw fuel from a supply tank, usually at a lower level than the carburetor and supply such fuel, ordinarily under a pressure four pounds per square inch. Since the fuel pump is actuated by the motor, the speed of the pump varies with the speed of the motor. In order to maintain a flow-chamber type of carburetor at its maximum efficiency, the fuel should be supplied to the flow chamber at a constant low pressure that does not exceed usually one-half of one pound per square inch, regardless of the rate at which said fuel is being used by said carburetor. By placing the pressure regulator herein set forth in the fuel line leading from the fuel pump to the carburetor, a constant low pressure on the fuel in the chamber of the carburetor will be maintained automatically, irrespective of variations in pressure on the fuel being delivered by the pump and variations in the rate at which fuel may be used by the carburetor. It will be noted that the stem 30 extends above the plug 41 and a pressure recording instrument may be applied to said stem or a pressure gauge may be attached to one of the openings 45. The spring 38 may be adjusted when the meter is installed and thus satisfactory operation on each particular motor is assured.

The stem 30 may be used to test the spring 38. The cup 13 and the screen or strainer 16 form a trap for sediment and foreign matter. The ball 28 in co-action with the seat 27, bore 26 and port, acts to dampen the pulsations of the pumped liquid.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A pressure regulator including, an enclosure having a liquid inlet and a liquid outlet, a valve seat connected with said inlet, a free and unattached valve ball arranged to engage the seat and to move relative thereto for controlling the flow through said inlet, a lateral support within the enclosure below the valve ball for supporting the latter, whereby movement of the support moves said ball with relation to its seat, a flexible diaphragm exposed to and actuated by the pressure of the liquid flowing past said ball, a vertical member depending from the diaphragm and connected with the support, a bonnet above the diaphragm on the enclosure, a stem extending from the support and diaphragm through the bonnet, and a single resilient means surrounding the stem within the bonnet exerting a downward pressure on the diaphragm.

2. A pressure regulator as set forth in claim 1, with a stop in the enclosure for limiting downward movement of the diaphragm to control the full open position of the valve ball.

3. A pressure regulator as set forth in claim 1, wherein the upper end of the stem is exposed above the bonnet.

4. A pressure regulator including, a bowl having a liquid inlet and a liquid outlet, a conduit extending from the inlet into the bowl having a downwardly discharging opening provided with a valve seat therein, a cup secured to the bottom of the bowl, a plunger mounted in the bowl and extending into the cup, a lateral support carried by the plunger in the cup, a free valve ball resting on the support below the valve seat and confined in the discharge opening of the conduit, a bonnet secured on top of the bowl, a diaphragm confined between the bowl and the bonnet and attached to the upper end of the plunger, a stem extending from the plunger through the bonnet, and a coil spring confined in the bonnet around the stem bearing on top of said diaphragm.

5. A pressure regulator as set forth in claim 4 wherein the conduit has an integral member at its inner end in the center of the bowl through which the plunger slides, the upper end of said member constituting a stop to limit the downward movement of the diaphragm.

6. A pressure regulator as set forth in claim 4, with an adjustable plug in the top of the bonnet through which the stem is loosely slidable to permit air to flow thereby, a spring cup surrounding the stem on top of the diaphragm, a second spring cup surrounding the stem and abutting the plug, and a coil spring surrounding the stem having its ends confined in the last-named cups.

7. A flow meter including, a bowl having a liquid inlet in one side and a liquid outlet in its side spaced from the inlet, a conduit having a passage therein extending from the inlet into the bowl and having a downwardly directed outlet having a valve seat therein, a freely movable valve ball projecting into the outlet of the conduit and adapted to be moved upwardly to seat against said valve seat, a vertically movable member in the bowl, a lateral support extending from the member and upon which the ball rests, a diaphragm across the bowl attached to the movable member, and a coiled spring in the bowl surrounding the movable member and acting downwardly on the diaphragm.

8. A flow meter as set forth in claim 7, wherein the conduit immediately underlies the diaphragm and limits the downward movement of said diaphragm.

9. A flow meter as set forth in claim 7, wherein the conduit outlet has a beveled valve seat and an enlarged bore therebelow larger in diameter than the diameter of the ball, whereby the ball is free to move laterally and seat itself.

HENRY L. VINING.

REFERENCES CITED

The following references are of record in the file of this patent:

UNITED STATES PATENTS

| Number | Name | Date |
|---|---|---|
| 234,051 | Moore | Nov. 2, 1880 |
| 392,447 | Meyer | Nov. 6, 1888 |
| 1,833,944 | Hull | Dec. 1, 1931 |
| 2,103,576 | Dockson | Dec. 28, 1937 |
| 2,288,733 | Nieseman | July 7, 1943 |